United States Patent [19]

Beale

[11] 3,915,505

[45] Oct. 28, 1975

[54] PNEUMATIC GRAIN CONVEYOR

[76] Inventor: Elden C. Beale, 606 Cardinal St., Lodi, Calif. 95240

[22] Filed: Aug. 29, 1974

[21] Appl. No.: 501,603

[52] U.S. Cl. .................................... 302/23; 302/17
[51] Int. Cl.² ......................................... B65G 53/58
[58] Field of Search ...................... 302/17, 23–25, 302/29, 30, 33

[56] References Cited
UNITED STATES PATENTS

| | | | |
|---|---|---|---|
| 3,205,016 | 9/1965 | Panning | 302/23 |
| 3,279,862 | 10/1966 | Hubbard | 302/23 |
| 3,285,670 | 11/1966 | Hubbard | 302/23 |
| 3,600,041 | 8/1971 | Hirano et al. | 302/23 |

*Primary Examiner*—Evon C. Blunk
*Assistant Examiner*—Jeffrey V. Nase
*Attorney, Agent, or Firm*—Roger B. Webster

[57] ABSTRACT

A pneumatic grain conveyor comprising —on a mobile frame, and in connection between a grain-feed conduit and a grain-discharge conduit—a drum-like housing having an axial power-driven tube rotatably journaled therein, one end of the tube extending beyond one end of the housing and being coupled, in turnable relation, to the grain-feed conduit, the opposite end of the tube terminating adjacent the other end of the housing, an axial venturi neck on said other end of the housing coupling the latter to the grain-discharge conduit, said terminal end of the tube projecting into the venturi neck in spaced relation thereto, a housing-enclosed fan mounted on the tube intermediate its ends, and a perforate air passage section in the tube between the fan and said one end of the housing; all whereby to produce a suction air flow in the grain-feed conduit and tube, and a pressure air flow in the grain-discharge conduit; the grain flowing through said tube being size-precluded from passage through said perforate section.

10 Claims, 3 Drawing Figures

PNEUMATIC GRAIN CONVEYOR

BACKGROUND OF THE INVENTION

Both mechanical (driven auger type) and pneumatic (air flow type) grain conveyors are known, but present certain problems. In the mechanical conveyors, the driven auger tends to impose grinding or abrading action on the grain, while in air flow type conveyors some of the grain may be impinged and shattered by the fan or the like which produces the air flow. The present invention was conceived in a successful effort to overcome the problem of grain damage in a pneumatic grain conveyor, while providing a commercially acceptable apparatus.

SUMMARY OF THE INVENTION

The present invention provides, as a major object, a pneumatic grain conveyor wherein rapid passage—without damage—of the grain through the apparatus is assured; the conveyor, in particular, comprising—on a mobile frame, and in connection between a grain-feed conduit and a grain-discharge conduit—a drum-like housing having an axial power-driven tube rotatably journaled therein, one end of the tube extending beyond one end of the housing and being coupled, in turnable relation, to the grain-feed conduit, the opposite end of the tube terminating adjacent the other end of the housing, an axial venturi neck on said other end of the housing coupling the latter to the grain-discharge conduit, said terminal end of the tube projecting into the venturi neck in spaced relation thereto, a housing-enclosed fan mounted on the tube intermediate its ends, and a perforate air passage section in the tube between the fan and said one end of the housing; all whereby to produce a suction air flow in the grain-feed conduit and tube, and a pressure air flow in the grain-discharge conduit; the grain flowing through said tube being size-precluded from passage through said perforate section.

The present invention provides, as an additional important object, a pneumatic grain conveyor, as above, which has a relatively great capacity and functions smoothly and effectively with a minimum of manual attention; thus being an economical and labor-saving apparatus. Also, as the conveyor is mobile, it can be readily and conveniently moved from place to place as desired.

The present invention provides, as a still further object, a practical, reliable, and durable pneumatic grain conveyor, and one which is exceedingly effective for the purpose for which it is designed.

DESCRIPTION OF THE PREFERRED EMBODIMENT

Figure 1:
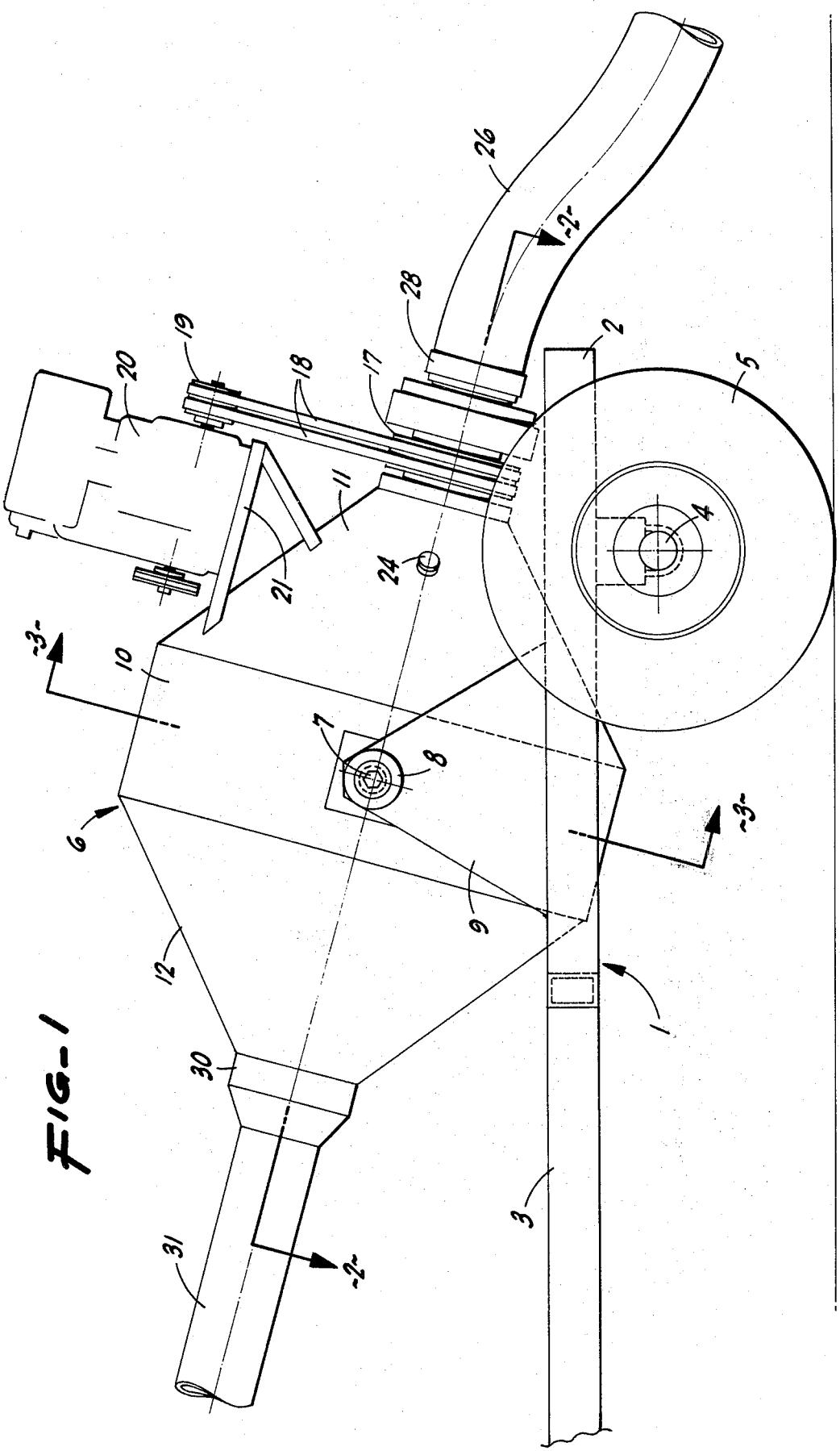
FIG. 1 is a side elevation of the pneumatic grain conveyor.
Figure 2:
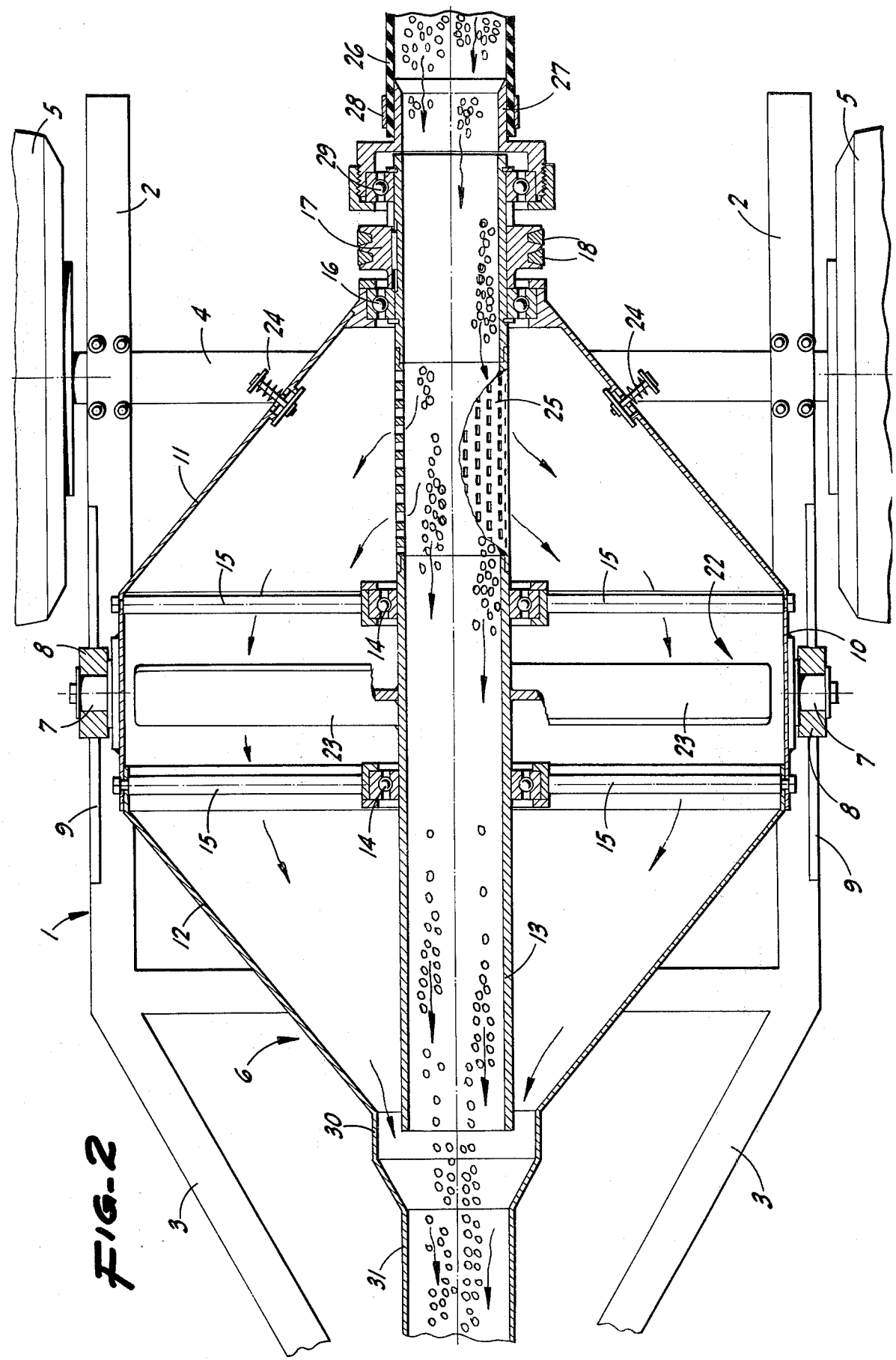
FIG. 2 is an enlarged, sectional plan taken substantially on line 2—2 of FIG. 1.
Figure 3:
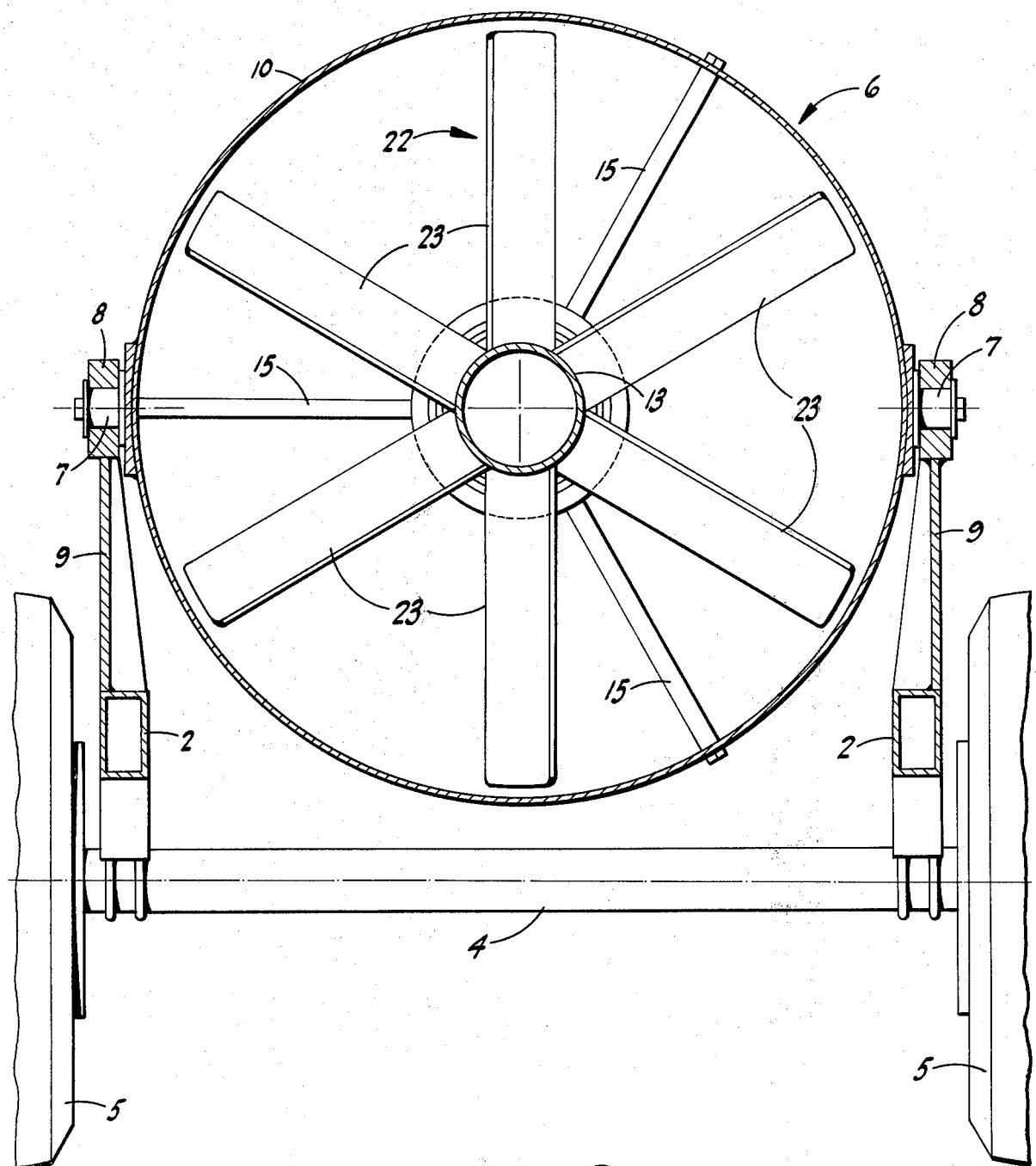
FIG. 3 is an enlarged, transverse sectional elevation taken substantially on line 3—3 of FIG. 1.

Referring now more particularly to the drawings and to the characters of reference marked thereon, the pneumatic grain conveyor, of the present invention, comprises an aboveground main frame 1 which includes transversely spaced, longitudinal side beams 2, and forwardly converging draft beams 3 which, at the front, are adapted (by conventional means not shown) to couple to a motor vehicle. Adjacent the rear of the frame 1, the side beams 2 are connected by a transverse axle 4 fitted at the ends with wheels 5. All of the foregoing provides a trailer on which is mounted the functional portion of the conveyor, and which is constructed as follows:

A longitudinal axis, drum-like housing, indicated generally at 6, is disposed mainly above the frame 1, and is mounted in connection therewith by laterally projecting trunnions 7 carried in collars 8 on the upper end of flat standards 9 which upstand from the side beams 2.

The drum-like housing 6 is comprised of an annular central section 10, a frusto-conical rear section 11, and a frusto-conical front section 12; the trunnions 7 projecting from such central section 10.

A rigid, relatively large diameter tube 13 is disposed axially in the housing, and is journaled for rotation therein by means including—in the zone of the central section—axially spaced bearings 14 on the inner ends of circumferentially spaced, radial stay bars 15 which project inwardly from said central section. Additionally, the rear end portion of tube 13 projects out of the rear end section 11, of housing 5, through a supporting bearing 16.

Exteriorly of the housing section 11, the projecting portion of tube 13 is fitted with a pulley 17 driven by multiple endless belts 18 from a corresponding drive pulley 19 on the output shaft of an internal combustion engine 20 mounted on a platform 21 suitably secured on said housing section 11. As is apparent, the engine 20 serves to rotate the tube 13 within the housing 6, irrespective of the tilt-position of the latter.

A multiple blade fan, indicated generally at 22, is mounted on the tube 13 intermediate the bearings 14; the radial fan blades 23 being positionally disposed, or angled, so that—upon rotation of said tube 13 by the engine 20—a forceful air blast is created in housing 6 with the flow in the direction of the outer end of the front section 12 of said housing; this creating a suction in the rear section 11 and a pressure in said front section 12. In order to provide for supplemental air entry into such rear section 11, the latter may be fitted with suction-opened poppet valves 24.

In the zone of the rear section 11 of and within the housing 6, the tube 13 includes a perforate section 25 whose perforations are of a limited size for the reason to later appear. The perforate section 25 is of an axial extent approximating that of said rear section 11.

A grain-feed conduit 26—preferably a heavy duty, relatively large-diameter, flexible hose—is coupled to an attachment neck 27 (by a clamping strap 28) included in integral, non-turnable relation, with the stationary part of a bearing 29 on the rear end of the projecting portion of tube 13.

At its outer end, the front section 12, of the housing 6, includes a venturi neck 30 which communicates in rigid relation with a discharge conduit 31 which may terminate in an elevated spout (not shown).

The front end of the tube 13 terminates—in spaced relation—in the venturi neck 30; the spacing permitting forceful air flow from the front section 12 into neck 30 and about the terminal end of said tube to produce a suction effect; i.e., a suction in the tube forwardly of the perforate section 25.

OPERATION

In use, the conveyor—which is mobile—is disposed so that the feed conduit 26 communicates with a supply of bulk grain (as in a bunker); while the discharge conduit 31 is in position to deliver to a receiving container (such as the bin of a transport truck).

Thereafter, the engine 20 is placed in operation, and—through the medium of the endless belt and pulley assembly (17-18-19)—rotates the tube 13, and multiple blade fan 22 thereon, at a substantial speed. With such rotation of the fan 22, a forceful air flow is created in the housing 6 from the rear to front thereof and with an attendant suction flow in grain-feed conduit 26 and through the perforate section 25 into said housing. Such suction air flow carries the bulk grain through said conduit 26 and into the tube 13, but—due to the perforations in section 25 being individually smaller than the grain size—the grain cannot pass through such perforations, and hence does not gain access to the interior of the housing.

Beyond the perforate section 25, the grain is advanced in the tube 13 and therefrom into the neck 30 by the aforesaid suction flow created by the venturi effect which results from the forceful air flow, from within the housing, passing about the terminal end of said tube 13 in such neck 30. Therebeyond, the pressure air flow (in the nature of an exhaust) in the conduit 31 receives the grain from neck 30 and conveys such grain to the point of discharge.

It is thus evident that the grain, as it flows in an air stream through the described conveyor, is not subject at any time to any mechanical action, or impact force, which would tend to shatter or otherwise damage the grain. This advantage is coupled with the fact that the described conveyor functions effectively and in a manner which requires a minimum of attention, and hence is a labor saver.

From the foregoing description, it will be readily seen that there has been produced such a pneumatic grain conveyor as substantially fulfills the objects of the invention as set forth herein.

While this specification sets forth in detail the present and preferred construction of the pneumatic grain conveyor, still in practice such deviations from such detail may be resorted to as do not form a departure from the spirit of the invention as defined by the appended claims.

I claim:

1. A pneumatic grain conveyor comprising, in connection between a grain-feed conduit and a grain-discharge conduit, a housing having a rear end and a front end, a tube rotatably journaled in the housing axially between such ends thereof, one end of the tube extending rotatably through and projecting beyond the rear end of the housing, drive means connected to the projecting portion of the tube, means turnably coupling said projecting portion of the tube to the grain-feed conduit, an axial neck on the front end of the housing coupled to the grain-discharge conduit, the other end of the tube terminating within the housing in adjacent but spaced relation to said neck, a housing-enclosed fan mounted on the tube intermediate the ends of the housing, and a perforate section included in the tube between the fan and the rear end of the housing, the perforations of said section being of a size to preclude the passage of grain therethrough.

2. A pneumatic grain conveyor, as in claim 1, in which said neck is of venturi form, and said terminal end of the tube being disposed in spaced relation in such neck.

3. A pneumatic grain conveyor, as in claim 1, including an annular bearing unit on the tube adjacent the fan, and radial stay bars between the bearing unit and the housing.

4. A pneumatic grain conveyor, as in claim 3, including another bearing unit between the tube and the rear end of the housing.

5. A pneumatic grain conveyor, as in claim 1, including bearing units on the tube adjacent and at opposite sides of the fan, and radial stay bars between the bearing units and the housing.

6. A pneumatic grain conveyor, as in claim 1, in which the housing is comprised of a central annular section and opposed frusto-conical end sections; the fan being positioned on the tube in the radial plane of said central section.

7. A pneumatic grain conveyor, as in claim 1, in which said drive means comprises an engine mounted in fixed relation to the housing, and an endless belt and pulley system connected between the engine and said projecting portion of the tube.

8. A pneumatic grain conveyor, as in claim 1, in which the means turnably coupling said projecting portion of the tube to the grain-feed conduit includes a bearing on such tube portion.

9. A pneumatic grain conveyor, as in claim 8, in which said drive means includes a pulley on said tube portion ahead of such bearing thereon, an engine mounted in fixed relation to the housing, the engine having a drive pulley, and an endless belt extending between such pulleys.

10. A pneumatic grain conveyor, as in claim 1, in which the housing is comprised of an annular central section and opposed frusto-conical end sections; the fan being positioned on the tube in the radial plane of said central section, and said perforate section of the tube being of an axial extent approximating that of the corresponding frusto-conical section of the housing.

* * * * *